United States Patent [19]

Terasaka

[11] Patent Number: 4,942,848

[45] Date of Patent: Jul. 24, 1990

[54] AIR-FUEL RATIO CONTROL SYSTEM FOR AUTOMOTIVE INTERNAL COMBUSTION ENGINE OR THE LIKE WITH FUEL TYPE DISCRIMINATION CAPABILITIES

[75] Inventor: Katsunori Terasaka, Yokosuka, Japan

[73] Assignee: Nissan Motor Co., Ltd., Yokohama, Japan

[21] Appl. No.: 188,510

[22] Filed: Apr. 29, 1988

[30] Foreign Application Priority Data

Apr. 30, 1987 [JP]  Japan ............................. 62-107365
Aug. 6, 1987 [JP]  Japan ............................. 62-196971

[51] Int. Cl.$^5$ ..................... F02D 41/14; G01N 33/22
[52] U.S. Cl. ................... 123/1 A; 123/489; 123/491; 123/494; 73/117.3
[58] Field of Search ............. 123/1 A, 440, 489, 589, 123/494, 491, 421; 73/117.3

[56] References Cited

U.S. PATENT DOCUMENTS

| | | | |
|---|---|---|---|
| 4,031,864 | 6/1977 | Crothers ............................ | 123/1 A |
| 4,191,137 | 3/1980 | Williams et al. .................... | 123/491 |
| 4,594,968 | 6/1986 | Degobert et al. ................... | 123/1 A |
| 4,619,236 | 10/1986 | Okada et al. ....................... | 123/425 |
| 4,630,584 | 12/1986 | Higashiyama et al. ............. | 123/421 |
| 4,640,251 | 2/1987 | Harada et al. ...................... | 123/425 |
| 4,691,680 | 9/1987 | Staerzl ................................ | 123/491 |
| 4,706,630 | 11/1987 | Wineland et al. .................. | 123/1 A |

FOREIGN PATENT DOCUMENTS 56-32451  7/1981  Japan.

*Primary Examiner*—Andrew M. Dolinar
*Attorney, Agent, or Firm*—Foley & Lardner, Schwartz, Jeffery, Schwaab, Mack, Blumenthal & Evans

[57] ABSTRACT

Routines are run which briefly monitor a selected parameter and ascertain, based on the magnitude of the parameter, the use of heavy, regular or light fuel. These routines set correction factor values which are used to modify fuel injection, ignition timing and the like, during transient modes of engine operation. Tables used in the identification are recorded in two-dimensional form. Following an identification and correction factor determination, the programs are adapted to terminate very early in the run. Depending on the change in fuel tank volume, previously obtained data is assumed to still hold true and analytical routines forshortened to obviate redundant re-analysis and lighten processor load.

11 Claims, 19 Drawing Sheets

FIG.16
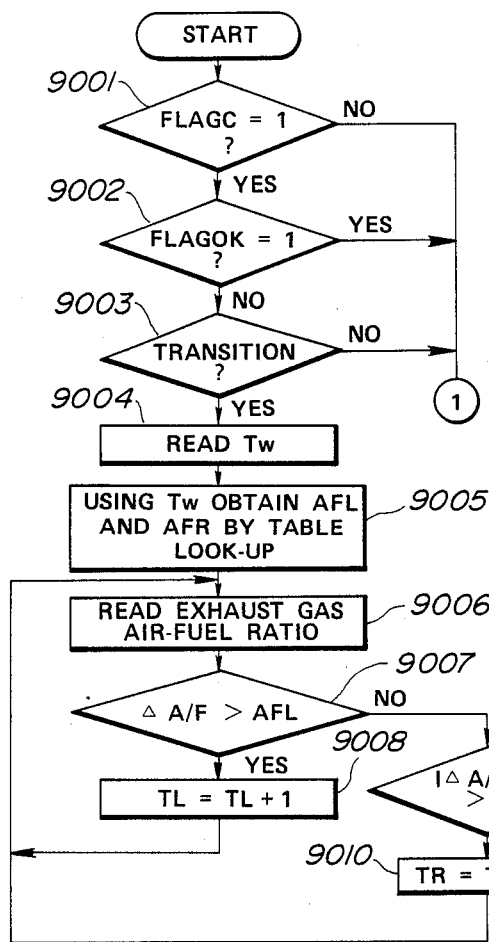
FIG.17
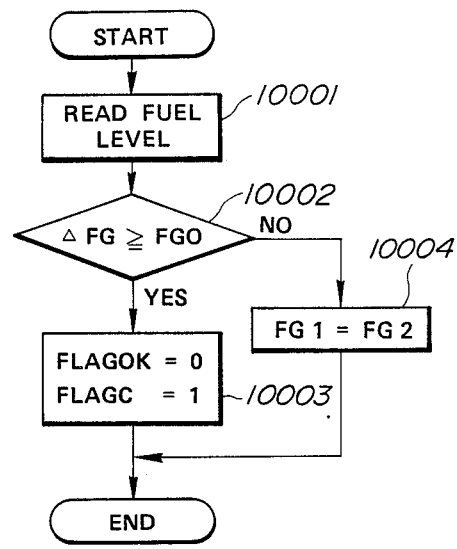
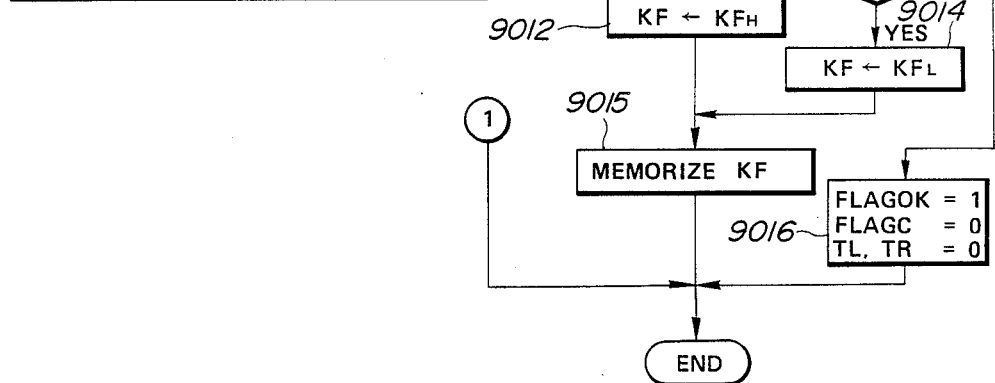

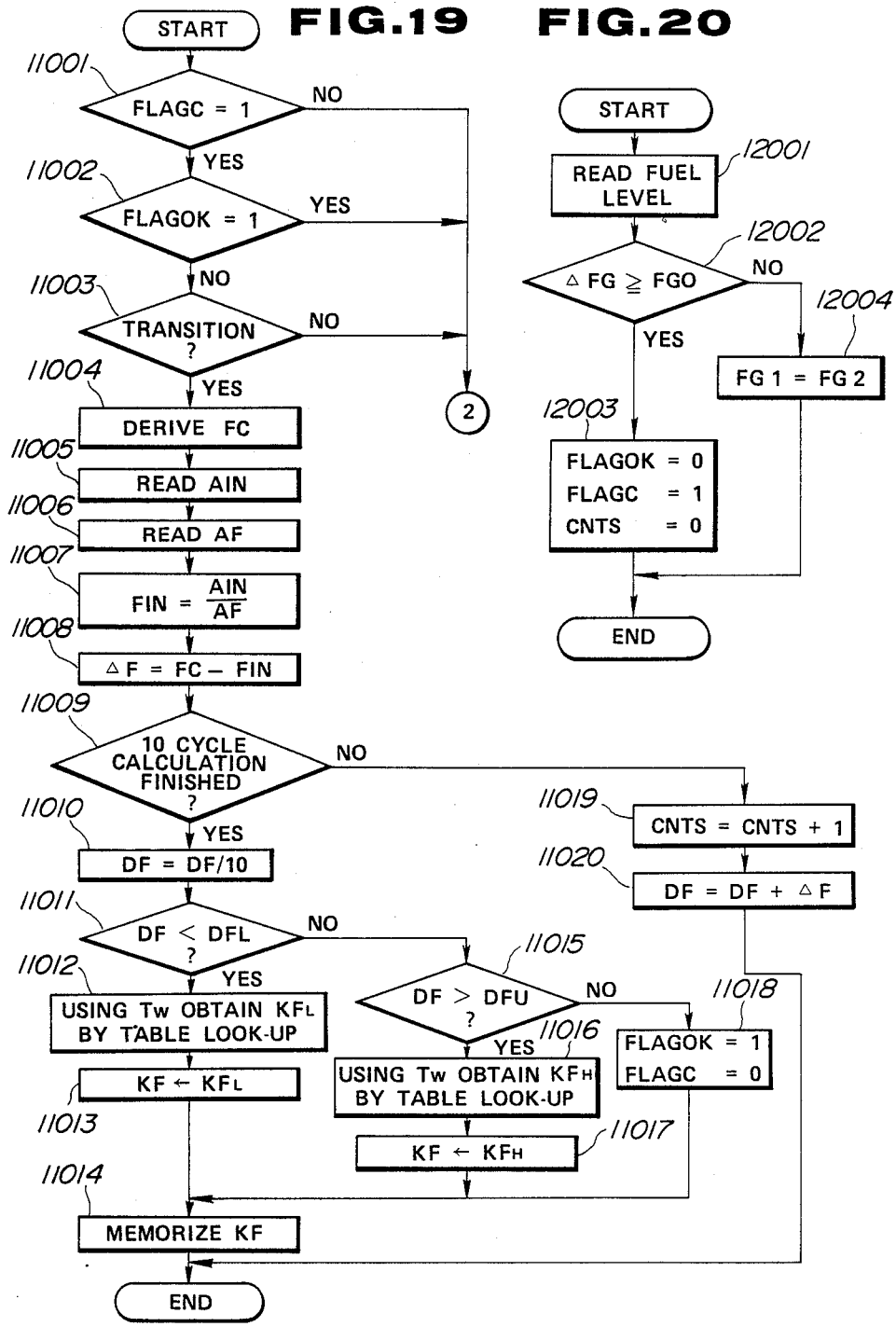

AIR-FUEL RATIO CONTROL SYSTEM FOR AUTOMOTIVE INTERNAL COMBUSTION ENGINE OR THE LIKE WITH FUEL TYPE DISCRIMINATION CAPABILITIES

BACKGROUND OF THE INVENTION

1. Field of the Invention

The present invention relates generally to automotive engines and more specifically to a fuel supply control system for an internal combustion engine of the type used in automotive vehicles and the like.

2. Description of the Prior Art

FIG. 1 schematically shows an internal combustion engine system 1 which includes an induction port 2, an induction manifold arrangement 3 which is operatively connected with the induction port; a throttle valve 4 disposed in the induction manifold arrangement for controlling the amount of air which is permitted to pass to the induction port 2; an air flow sensor disposed in the induction manifold at a location upstream of the throttle valve for sensing the amount air passing through the induction system; an engine speed sensor 6 for producing a train of pulses the frequency of which is indicative of the engine rotational speed. The system further includes a fuel injector arranged to inject fuel into the induction port 2; an exhaust manifold 8; an air-fuel ratio sensor disposed in the exhaust manifold and arranged to sense the amount of oxygen present in the exhaust gases; an engine temperature coolant sensor which projects into the coolant jacket of the engine; a spark plug 12 and a control circuit 13. The latter mentioned circuit is arranged to receive inputs from the air flow sensor 5, engine speed sensor 6, air-fuel ratio sensor 9 and the coolant temperature sensor 11; and produce outputs to the fuel injector 7 and spark plug 12.

Japanese Patent Publication JA-P-56-32451 discloses an arrangement which has been proposed for obviating the deterioration in the emission control and engine performance characteristics which inevitably tend to occur in the above disclosed type of engine when the fuel being fed to the engine changes from a standard type to either so called heavy and light types.

The above mentioned deterioration in emission control is particularly evident in the case a three-way type catalytic converter is being used with the engine.

With this type of arrangement relatively small changes from the target air-fuel ratio have a large effect on the emission concentration level (viz., the concentrations of HC, CO, NOx). For example, as will be appreciated from FIG. 2, in order to maintain the conversion rate above 80% it is necessary to control the air-fuel ratio within a narrow range W wherein the value A is approxiately the stochiometric air-fuel ratio.

Accordingly, the arrangement disclosed in the above mentioned JA-P-56-32451 has attempted to provide the necessary control by including a so called "L - jetronic" type fuel injection control system in an engine system of the nature shown in FIG. 1. In this type of injection system the pressure of the fuel supplied to the injectors is kept constant and the amount of fuel controlled by varying the width of the control signal pulse which is applied to the solenoids of the injectors.

In accordance with this system the injection control pulse width is calculated using the following equation:

$$Ti = Tp(K \times Qa/N \times \text{alpha} + Ts \qquad (1)$$

wherein:

Tp is the basic injection control width;

Qa is the amount of air sensed being inducted into the engine by an air flow meter 5 or similar device;

N is the rotational speed of the engine;

alpha is a feed-back correction factor which compensates for the delay between the actual combustion and the sensing of the air-fuel ratio of the combusted air-fuel mixture in the exhaust gases; and Ts is the rise time of the injector.

However, with this type of system when the fuel changes from a standard type to a less volatile type or so called heavy fuel and the engine is subject to acceleration (transient operation), the air-fuel ratio deviates from the target value and the mixture becomes excessively lean. This reduces the drivability of the engine and induces an increase in the emission level.

The reason for this is that the volatilization characterstics in the induction passage is dependent on the content of the fuel and the manner in which it distills into a gaseous fraction and a liquid fraction.

The gaseous fraction of course flows to the combustion chamber much faster than the liquid fraction most of which runs along the walls of the passage.

Accordingly, with heavy fuel wherein the volatile faction is lower than that of regular fuel, the gaseous faction reduces and wall running faction increases as compared with regular fuel.

During steady state operation this distribution essentially no effect on the air-fuel ratio of the air-fuel mixture formed in the combustion chamber or chambers of the engine. However, during vehicle acceleration while the same amount of fuel is injected as in the case wherein regular fuel is used, in the case of heavy fuel, as the wall fraction increases and the gaseous fraction decreases, a longer period of time is required for the injected volume to actually reach and enter the combustion chamber. Thus, the amount of fuel which is permitted to enter the combustion chamber for the instant engine speed and valve timing is reduce due to the increased relatively slow moving wall running fraction.

Conversely, in the event that alcohol or the like is mixed with the fuel or the volatile fraction contained in the fuel increase, the amount gassified fuel as compared with the liquid wall running fraction increases and during acceleration, the amount of fuel actually entering the combustion chamber increases as compared with the case wherein regular fuel is used.

This of course tends to produce a rich mixture which invites increased HC emissions, increased fuel consumption and the like. Of course during steady state operation the effect of light fuel on the air-fuel ratio is essentially non-existant similar to the heavy fuel case.

In certain instances it is possible in the event that heavy fuel is commonly used (for example North America) to shift the target fuel air-fuel ratio from point A toward point B and thus increase the richness of the same in a manner which enables the air-fuel ratio to maintained within the desired limits during both steady state and transitional state operations.

However, if with the above mentioned modified target air-fuel ratio setting, the engine is operated on a fuel having a higher volatile more readily gassifiable fraction, the air-fuel mixture becomes excessively rich during transitional operation such as acceleration and deteriorates the emission control.

The reason for this is that in the case of light fuels which contain relatively large amount of readily volatile material, it is necessary, in order to achieve the same compromise achieved with heavy fuel, to shift the target air-fuel ratio toward point C.

In order to overcome this dilemma it has been proposed to utilize an air-fuel ratio sensor which is capable of produce a response over a relatively wide range of air-fuel ratio as different from commonly used oxygen sensors which exhibit a sudden and marked change in output over a very narrow range the center of which is the stoichiometric air-fuel ratio; and use this sensor in feed-back control loop a manner which enables it to be determined if the air-fuel ratio becomes rich or lean during transitional modes of operation and to shift the target air-fuel ratio in accordance with the outcome of this monitoring. Viz., if the air-fuel ratio is sensed as becoming lean during transitional mode of operation it can be assumed that the fuel being supplied is of the heavy type, and the target air-fuel ratio should be shifted from point A toward point B (FIG. 2) and vice versa.

However, in the event that the calculations necessary for the above mentioned control are carried out in commonly used mircoprocessors, they tend to occupy the CPU of the device to the degree that other calculations which are inevitably required to be concurrently carried out on a cycle by cycle basis, such as ignition timing, fuel injection and the like, cannot be successfully completed. Accordingly, it is necessary to use a high speed processor or a plurality of convential types which are suitably interconnected in a manner which emulates parallel processing or the like.

In either case the cost of the control system is undersirably increased.

SUMMARY OF THE INVENTION

It is an object of the present invention to provide a control system which is both relatively inexpensive and which places a relatively low load on the processor in which programs and calculations are performed.

In brief, the arrangements and techniques utilized in the various embodiments of the instant invention are such that in order to reduce the amount of microprocessor CPU time consumed by fuel type analytical routines and to reduce the cost of the system, routines are run which briefly monitor a selected parameter and determined whether heavy, regular or light fuel is being used. These routines set correction factor values which are used to modify fuel injection, ignition timing and the like during transient modes of engine operation. Tables used for obtaining the correction factors and the like are recorded in two-dimensional form.

Following a satisfactory identification and correction factor determination the programs are terminated very early in the run to minimize CPU use.

Depending on the amount of fuel consumed between system initializations or the like, the previously obtained data can be assumed to still hold true and analytical routines forshortened to obviate redundant re-analysis and reduce CPU usage.

More specifically, a first aspect of the present invention comes in the form of a method of determining the nature of the fuel being supplied to an internal combustion engine cylinder, the method featuring the steps of: sensing the magnitude a first parameter, the first parameter having a predetermined relationship with the fuel supplied to a cylinder of the engine; comparing the magnitude of the first parameter with a first predetermined value; sensing the magnitude of a second parameter in the event that the magnitude of the first parameter exceeds the predetermined value; determining a correction factor using the second parameter; using the correction factor in an engine control.

A second embodiment of the present invention comes in the form of a method of determining the nature of the fuel being fed to an internal combustion engine and which features the steps of: sensing the presence of transitional engine operation; sensing the temperature of the engine; selecting first and second air-fuel ratio limits from first and second schedules using the sensed temperature, the first schedule being adapted for a first type of fuel and the second schedule being adapted for a second type of fuel; sensing the air-fuel ratio of the exhaust gases of the engine; determining the difference between the instant air-fuel ratio and a predetermined air-fuel ratio; comparing the difference between the two air-fuel ratios with the first air-fuel ratio limit; using the engine temperature to obtain a first correction factor from a third schedule in the event that the difference is greater than the first air-fuel ratio limit; comparing the absolute difference between the two air-fuel ratios with the second air-fuel ratio limit in the event that the difference is less than the first air-fuel ratio limit; using the engine temperature to obtain a second correction factor from a fourth schedule in the event that the difference is greater than the second air-fuel ratio limit; and establishing a condition wherein the steps of sensing transitional engine operation to using the engine temperature are by-passed in the event that the absolute temperature difference comparing step indicates that the absolute difference is less than the second air-fuel limit.

A third aspect of the present invention comes in the form of a method of determining the nature of the fuel being fed to the cylinder or cylinders of an internal combustion engine, the method featuring the steps of: sensing the pressure prevailing in an induction system of the engine; comparing the instant pressure with a predetermined pressure; sensing the engine temperature in the instance the instant pressure is higher than the predetermined pressure; using the engine temperature to obtain a correction factor from a predetermined shcedule; incrementally increasing a count by one; determining if the count is less than or equal to a predetermined number in the event that the instant pressure is less than the predetermined pressure; and establishing a condition wherein the steps of pressure sensing to count determining are by-passed in the event that the count exceeds the predetermined number.

A fourth aspect of the invention comes in the form of a method of determining the nature of the fuel being supplied to an internal combustion engine which features the steps of: sensing the engine temperature; using the engine temperature to establish upper and lower time limits from a first schedule; determining the time require for the engine to reach a predetermined temperature; (d) comparing the time required with the upper and lower time limits; determining that the fuel being supplied to the engine is of a first type when the time require is longer than the upper limit, a second type when the time require is less than the lower limit and a third intermediate type when the time falls between the upper and lower limits; and using the engine temperature to obtain a suitable correction factor for the instant type of fuel using a second schedule.

A fifth embodiment of the present invention comes in the form of a method of determining the nature of the fuel being supplied to the cylinder or cylinders of an internal combustion engine, the method featuring the steps of: determining the volume of fuel contained in fuel tank from which fuel is supplied to the engine; determining the weight of the fuel contained in the fuel tank; determining the relative density of the fuel; determining the difference between the instant relative density and that for a standard fuel; comparing the difference in relative density with a first predetermined limit; determining the fuel to be of a first type in the event that the instant relative density is higher than the first predetermined limit; determining the fuel to be of a second type in the event that the absolute value of the difference in relative density is greater than a second predetermined value.

A sixth embodiment of the present invention comes in the form of a method of determining the nature of the fuel being supplied to the cylinder or cylinders of an internal combustion engine, the method featuring the steps of: detecting an unintentional engine stoppage; sensing engine temperature; using the engine temperature to determine a correction factor using a first schedule; determining the frequency with which engine stoppages occur; establishing a condition wherein detecting to determining steps are by-passed in the event that the frequency is below a predetermined one.

BRIEF DESCRIPTION OF THE DRAWINGS

FIGS. 16 to 18 pertain to a seventh embodiment of the present invention;

FIGS. 19 to 22 relate to an eighth embodiment of the present invention; and

DESCRIPTION OF THE PREFERRED EMBODIMENTS

Figure 1:
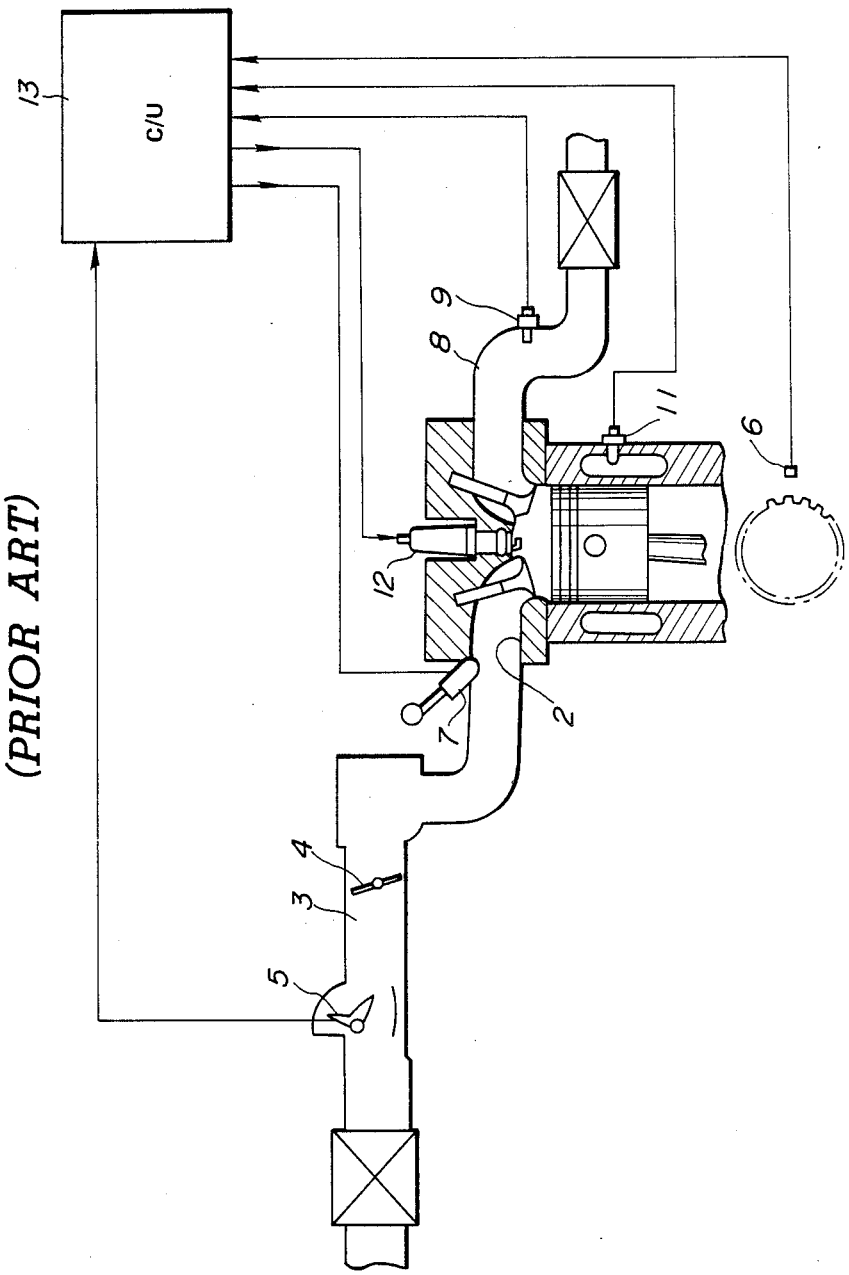
FIG. 1 is a schematic sectional elevation showing and engine system of the type to which prior art control arrangements have been applied.
Figure 2:
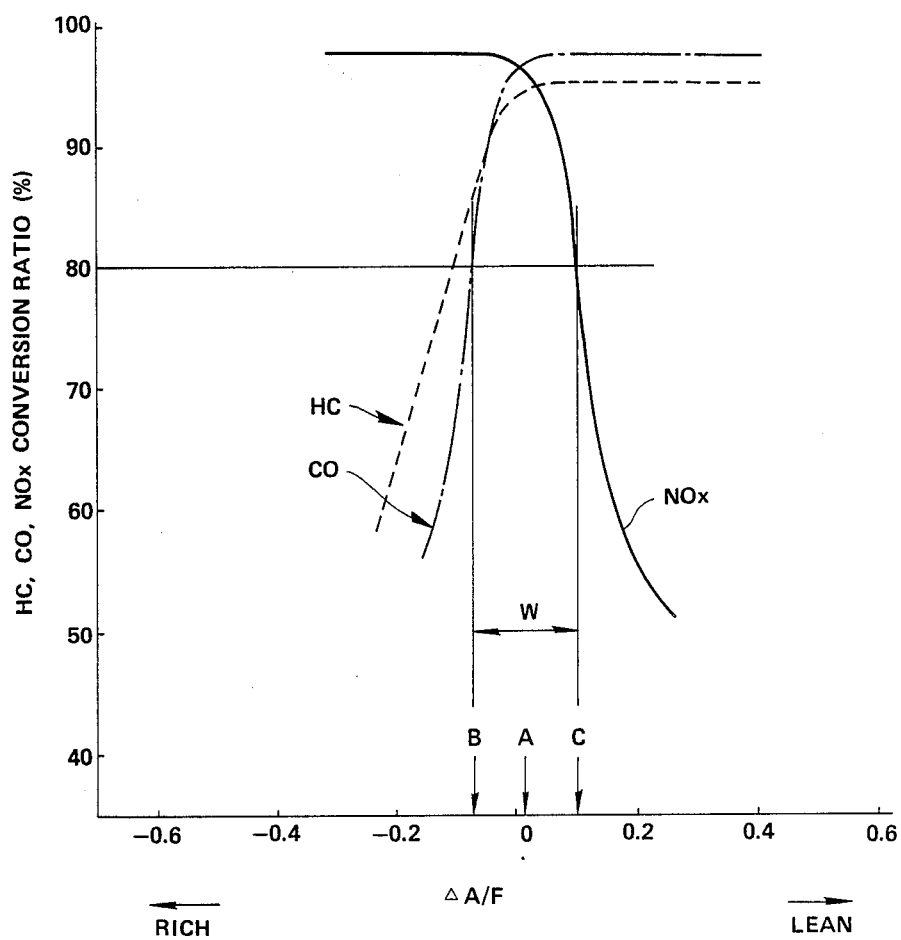
FIG. 2 is a chart showing in terms of emission conversion and air-fuel ratio the narrow band in which adequate conversion of all three of NOx, HC and CO is possible with so called three-way catalytic converter arrangements.
Figure 3:
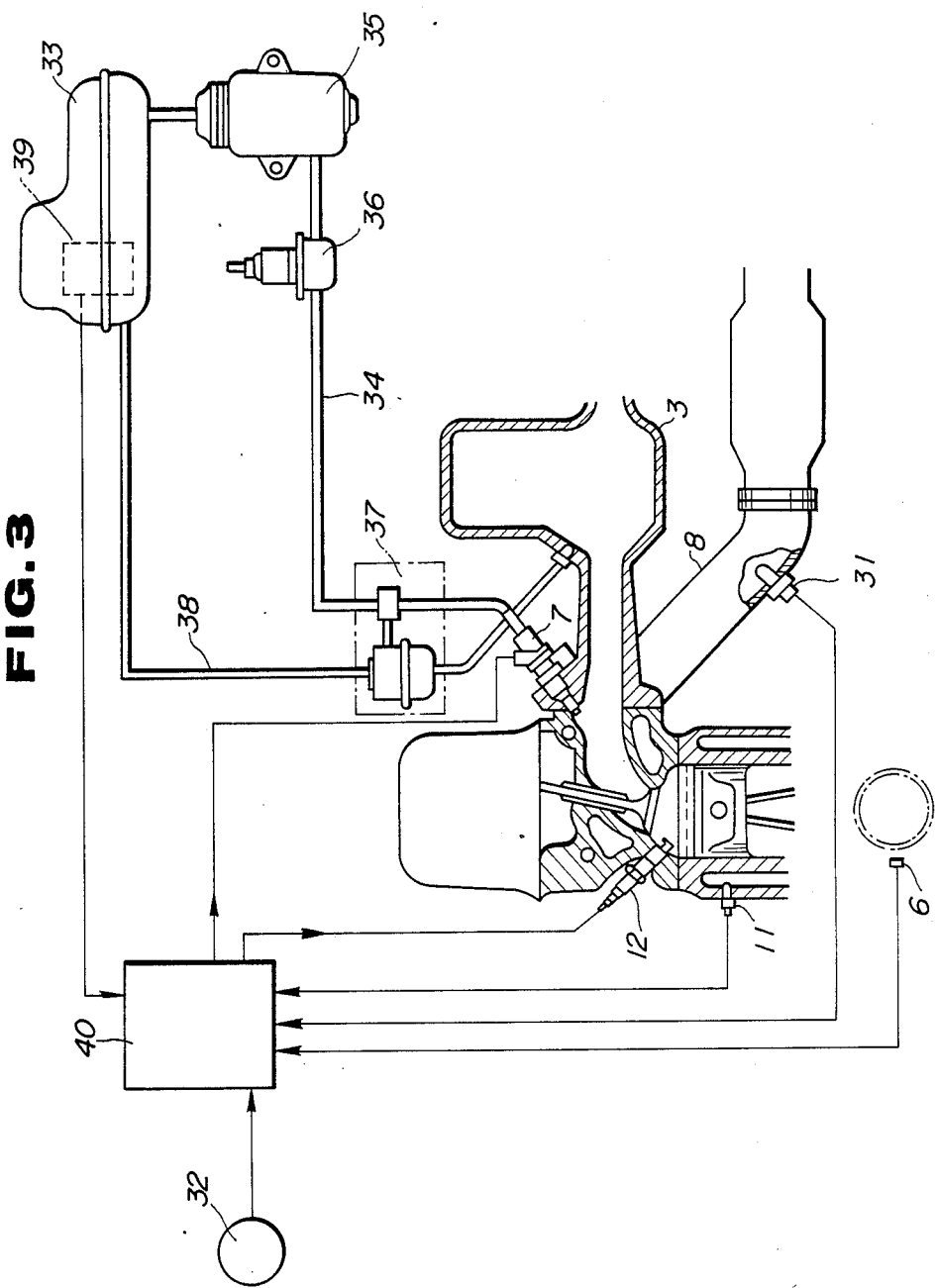
FIG. 3 is a schematic sectional elevation of an engine system to which a first embodiment of the present invention is applied.

FIG. 3 shows an engine system to which the first embodiment of the present invention is applied. This system includes a fuel tank 33; a fuel supply line 34; a fuel pump 35 disposed in the fuel supply line 34; a pressure fluctuation damper 36 located in the fuel line at a point downstream of the fuel pump 35; a pressure regulator arrangement 37 and a drain line 38 for returning excess fuel to the fuel tank 33. A fuel gauge 39 of the electrostatic type (merely by way of example) is disposed in the fuel tank 33 and arranged to sense the amount of fuel contained therein.

The system further includes a plurality of sensors, the inputs of which are fed to a control unit 40. In this embodiment the control unit 40 is arranged to include a microprocessor (not shown) comprising at least one RAM, ROM CPU and one or more I/O. The unit is arranged to be responsive to the data supplied and to generate suitable control signals which are applied to the fuel injector 7.

The above mentioned sensors include a throttle position sensor 32, a crank angle sensor 6, and an engine coolant temperature sensor 11. As will be appreciated the engine rotational speed N can be derived from the output of the rotational angle sensor 6 while the presence of absence of a transitional mode of engine operation can be detected from the output of the throttle valve position sensor 32 alone or in combination with that from the rotational angle sensor 6.

As the various techniques for detecting the presence of a transient mode of operation are well known in the art of automotive engine control no further disclosure will be given.

In addition to the above mentioned sensors, an air-fuel ratio sensor 31 is disposed in the exhaust manifold 8. In this embodiment this sensor 31 takes the form of the type which exhibits a relatively wide sensing range spanning the stoichiometric air-fuel ratio and which is able to sense the change in the air-fuel ratio on both the rich and lean sides of said stoichiometric mixture.

The injection pulse width Ti of the injector control signal is calculated using the equation which characterizes the previously mentioned L-Jetronic control method, Viz.:

$$Ti = Tp \times COEFF \times alpha + Ts \qquad (2)$$

wherein:

Tp is the basic fuel injection control pulse width;

COEFF is a compound correction factor which compensates for a number of effects including engine temperature and the like;

alpha is a feed-back control air-fuel ratio correct factor which takes into allowance the shift of the control value from the stoichiometric one; and Ts is the rise time required for the injector to actually open and begin injecting fuel after the control signal is applied thereto.

According to the embodiments of the present invention, the value Ti is derived using the above equation and the data supplied to the control circuit 40 is further modified using a correction factor KF which is indicative of the volatility characteristics of the fuel being injected.

Figure 4:
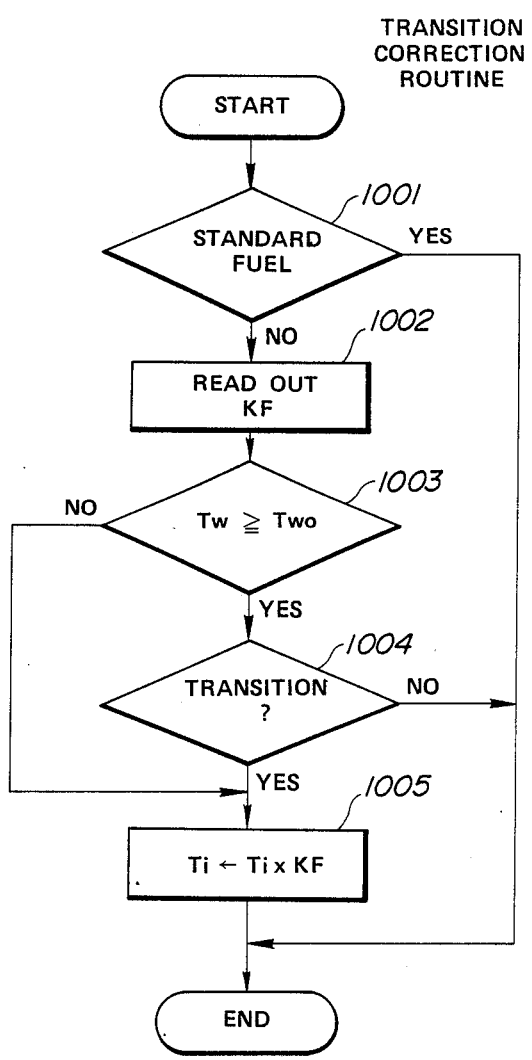
FIG. 4 is a flow chart showing the steps which characterize a transition correction routine used in conjunction with all of the embodiments of the present invention.

The flow chart shown in FIG. 4 depicts the steps which are carried out by a program memorized in the ROM of the control unit microprocessor and which is designed to implement the above mentioned correction.

As shown, the first step (1001) of this routine is such as determine if standard fuel is being used or not. In this case this decision made by ascertaining the value of KF which was last used in connection with the control of the fuel injection and which was resident RAM and/or the work space of the CPU. In order to facilitate this data storage the microprocessor can be arranged to have a back-up memory (e.g. CMOS RAM) in addition to a DRAM if so desired and the most recent KF value stored in this device.

The manner in which the KF value is derived will be dealt with in more detail hereinlater.

If the enquiry conducted at step 1001 is such as to indicate regular fuel was being used then the program immediately ends. However, in the instance that the memorized value is such as to indicate that non-regular or standard fuel is being supplied to the engine then at step 1002 the above mentioned value is read out of memory and appropriately installed ready for processing.

At step 1003 the output of the engine coolant temperature sensor 11 is read and the instant coolant temperature compared with a predetermined value TWO.

Figure 6:
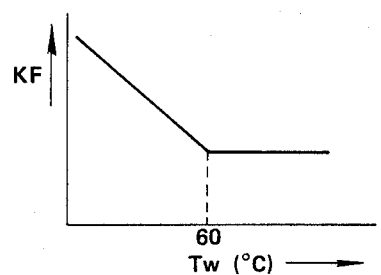
FIG. 6 is a chart showing correction factor KF plotted in terms of engine coolant temperature Tw.

In this instance the value of TWO is set at approximately 60° C. The reason for this is shown in FIG. 6. As will be appreciated, the value of KF decreases with the increase in coolant temperature until a value of approximately 60° C. is reached whereafter it becomes constant. By avoiding the use of values below 60° C. it renders it possible to simplify the recording of look-up tables which form a vital part of the instant invention and thus reduce the cost of the same. However, it is of course within the scope of the present invention to record and use data which occurs below the above mentioned lower limit if so desired. A further factor influencing this decision is that at low temperatures the amount of evaporation and resulting "distillation" of the fuel in the induction passages is low and thus reduces the significant difference between the various types of fuel.

At step 1004 the inputs from the throttle valve position sensor 32 and the rotational angle sensor 6 are read and the instant mode of engine operation is determined. Viz., it is determined if the engine is undergoing transitional or steady state operation.

In the event that step 1004 indicates that the engine is operating under steady state conditions, the program ends, while in the event that transitional operation such as engine acceleration is detected then the program goes to step 1005 wherein the instant value of Ti is modified in accordance with the instant value of KF.

With the present invention the COEFF factor can also be calculated in accordance with the type of fuel using a modified version of the L - Jetronic equation and thus effect a further improvement in the control provided by the instant invention. Viz.:

$$COEFF = 1 + Kt + Kacc \times KF \tag{3}$$

wherein:

Kacc is an previously proposed acceleration correction factor which is adapted for use with standard or regular fuel and which is provided to obviate the temporary formation of a lean air-fuel mixture; and Kt is an additional correction factor adapated to compensate for factors not included in the Kacc value.

Figure 5:
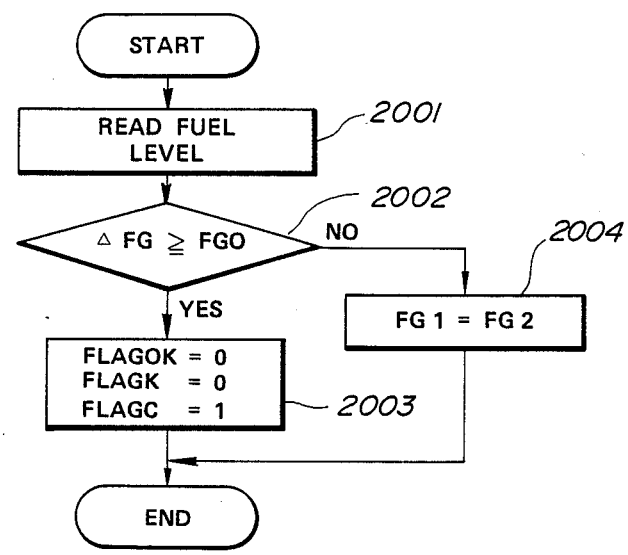
FIG. 5 is a flow chart depicting a flag check and setting routine used in connection with the first embodiment of the present invention.

FIG. 5 shows a flag setting routine which is run only once each time the system is put into operation.

By way of example only, this program can be arranged to be run each time the engine is started and the microprocessor in the control circuit 40 is initialized. The purpose of this routine is to determine if there has possibly been a change in the type of fuel in the fuel tank 33. Viz., if fuel has not been added to the fuel tank it can be assumed with reasonable confidence that no change in the nature of the fuel has occurred.

The first step of this routine is such as to read the output (FG2) of the fuel gauge 39, recall the value recorded (FG1) on the previous run of the program and determine the difference Delta FG (viz., FG2−FG1) therebetween. At step 2001 the difference in fuel volumes is compared with a predetermined value FGO. In the event that the change in fuel tank volume is sensed as being greater than or equal to FGO, the program goes to step 2003 wherein three flags, FLAGOK, FLAGK and FLAGC are set to 0, 0 and 1 respectively. However, if the volume change is found to be less than the predetermined value then, at step 2004 only the value of FG1 is updated to assume that of the instant FG2 reading.

Figure 7:
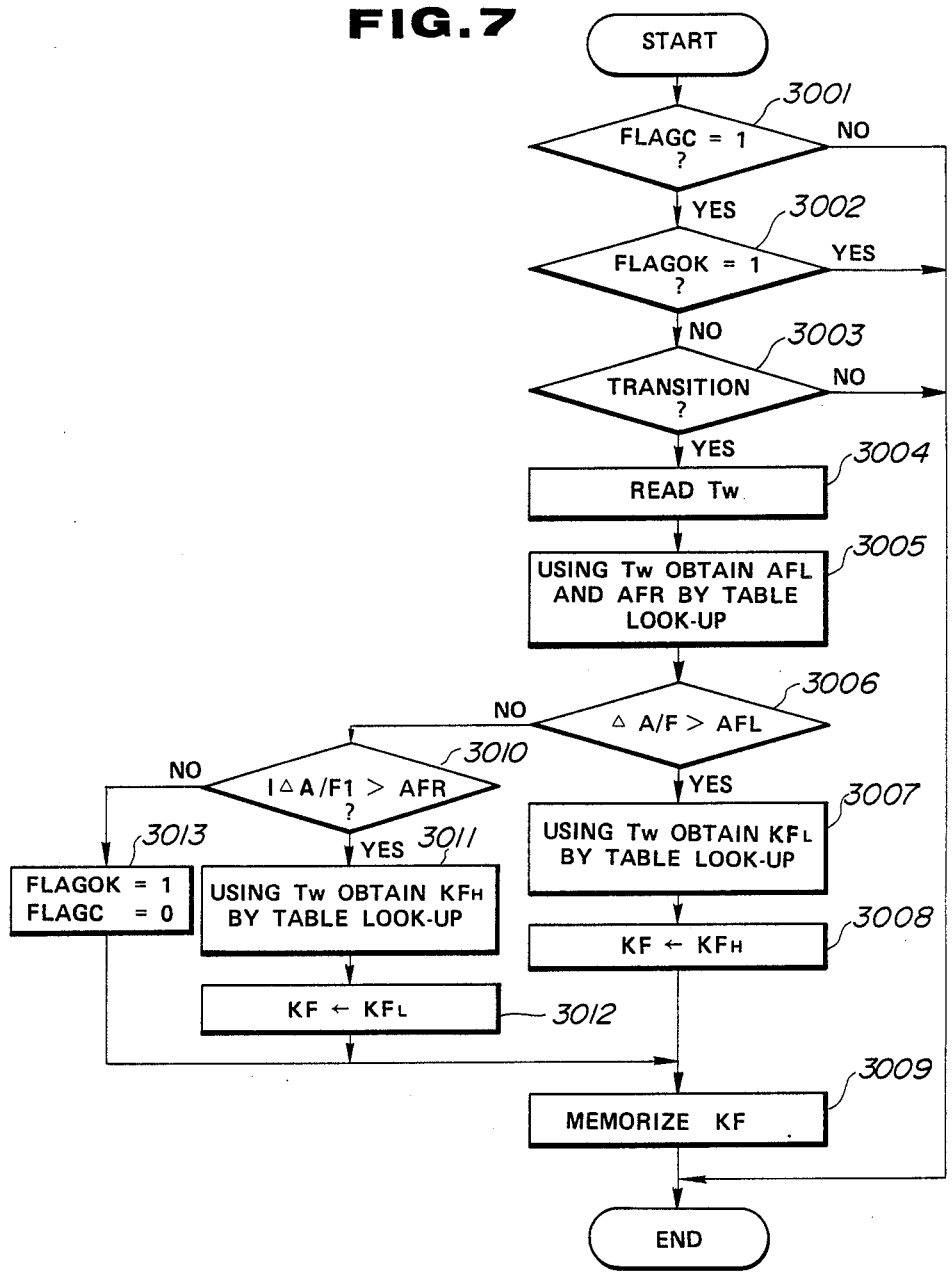
FIG. 7 is a flow chart showing the steps which characterize the fuel type analysis of the first embodiment of the present invention.

FIG. 7 shows a flow chart depicting the steps which characterize a routine which is run following the one shown in FIG. 5.

As will be noted, the first and second steps (3001, 3002) of this routine are such as to determine the instant status of flags FLAG C and FLAGOK. In the event that FLAG C=0 or FLAGOK=1 then the program ends. However, in the event that these conditions are not met, then it is assumed that there has possibly been a change in the type of fuel being supplied to the engine.

At step 3003 the outputs of the throttle valve position sensor 32 and the rotational angle sensor 6 are read and a determination made if the engine is operating under a transitional mode or not. In the event that this step indicates steady state operation the program ends. Viz., under these conditions there will be no effect of the fuel type on the air-fuel ratio of the mixture being formed in the combustion chamber or chambers of the engine and thus uncessary processing is avoided so as to reduce the load on the microprocessor CPU included in the control unit 40.

However, in the case transitional operation is detected the routine proceeds to step 3004 wherein the output of the coolant temperature sensor is read and the value TW installed in the work space for further processing.

At step 3005 the instant coolant temperature value TW is used in a manner which permits a table look-up of values AFL and AFR. These values are respectively the allowable deviation for regular or standard fuel from the transitional operation target air-fuel ratio to the lean side and the allowable deviation from the target value on the rich side. In this instance, the AFL and AFR tables are recorded in the form of two dimensional tables which are relatively simple and which do not consume excessive amounts of memory space.

At step 3006 the output of the air-fuel ratio sensor 31 is read and the difference between the target air-fuel ratio for the instant mode of operation and the instant air fuel ratio as indicated by the instant sampling of air-fuel ratio sensor. This value Delta A/F is firstly compared with the AFL value obtained in step 3005. In the event that the difference Delta A/F is greater than AFL the program flows to step 3007 wherein the instant coolant temperature value TW is used to enable the look-up of a value KFH using a simple two-dimensional table. This table is logged in terms of TW and KFH - a correction factor adapted for use with heavy fuels.

At step the instant value of KF resident in memory is updated to assume the value derived by the table look-up performed in step 3007. At step 3009 the new value is installed in memory in manner wherein it is available to the injection control program.

On the other hand, in the event that the outcome of the comparison conducted in step 3006 indicates that the instant change in air-fuel ratio from the desired value is less than AFL then the routine flows to step 3010 wherein the absolute value of the difference is compared with AFR (obtained in step 3005). In the event that the comparison indicates that the absolute value of the difference in air-fuel ratios is greater than the permissible value AFR then at step 3011 a look-up is performed using the instant coolant temperature TW in order to determine a value KFL. This value is of course the correction factor which is suited for use with light fuels which contain a relatively high volatile fraction. At step the instant KF value resident in memory is updated to that of KFL and set in an accessible memory location in step 3009.

However, in the event that the outcome of the comparision conducted in step 3010 indicates that the absolute air-fuel ratio difference is less than the AFR value, then at step 3013 flags FLAGOK and FLAGC are set to 1, and 0 respectively. This flag setting of course ensures that during the next run of the instant program will end at step 3001 and thus obviate wastefull use of CPU time.

Accordingly, with the first embodiment rather than repetitiously running a program on a cycle by cycle basis such as proposed in the prior art system and which places a large demand on CPU time, it is possible to briefly monitor the operation of the engine and the air-fuel mixture produced and determine what kind of fuel is contained in the fuel tank. After having determined the appropriate correction factor the routines are arranged so as to take up a minimized amount of CPU time and thus free the processor for other tasks.

SECOND EMBODIMENT

Figure 8:
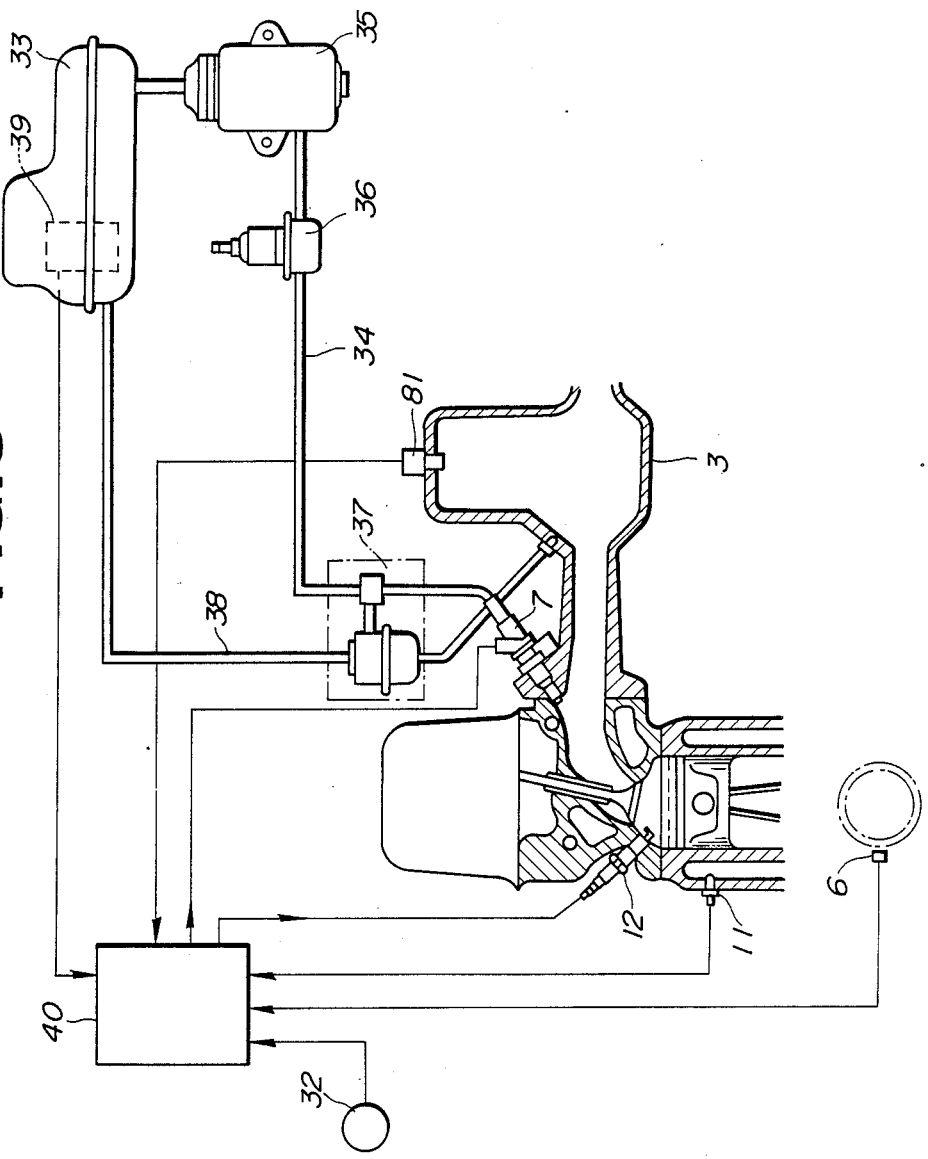
FIG. 8 is a schematic sectional elevation of an engine system to which a second embodiment of the present invention is applied.

FIG. 8 shows an engine system to which a second embodiment of the present invention is applied. This arrangement is essentially the same as the first one in terms of hardware but features the provision of a induction pressure sensor 81 in place of the exhaust gase air-fuel ratio sensor 31. It should be noted that the exhaust gas air-fuel ratio sensor is not necessary in the second embodiment and that if so desired it is possible to add the induction pressure sensor 81 to the system shown in FIG. 3, it being understood that it is not mandatory to remove the exhaust gas air-fuel ratio sensor 31.

The second embodiment has been proposed based on the knowledge that backfiring tends to occur when the air-fuel mixture suddenly becomes lean such as tends to occur with the use of heavy fuel. With the provision of the pressure sensor 81 in the induction manifold 3 the sudden rise in induction pressure which accompanies a backfiring can be readily detected.

Figure 9:
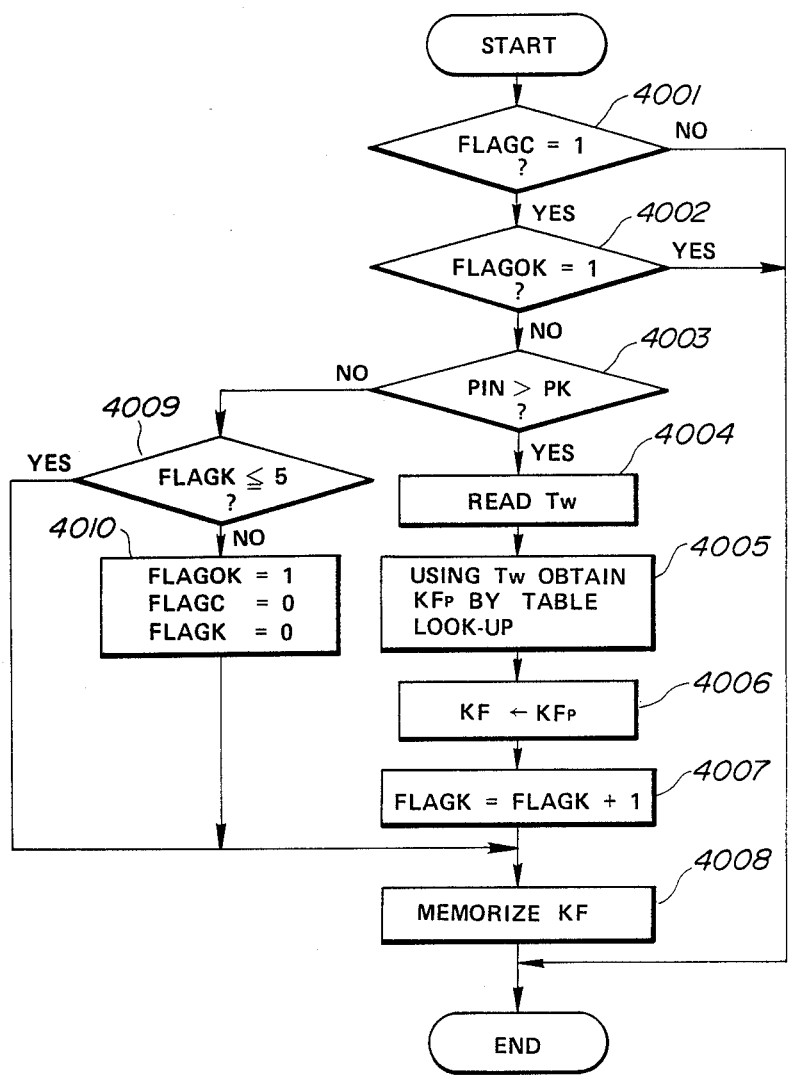
FIG. 9 is a flow chart showing the characteristic operations of the second embodiment.

The control which characterizes the second embodiment is depicted in flow chart form in FIG. 9. As will be noted the first two steps of this routine are the same as the first two steps (3001, 3002) of the routine shown in FIG. 7. At step 4003 the output of the pressure sensor 81 is sampled and compared with a predetermined value PK. In the event that outcome of the comparison is positive indicating that the pressure in the induction manifold is higher than normal then the program flows to step 4004 wherein the output TW of the coolant temperature sensor 11 is read and set in RAM or a section of the processor work space for further processing. At step 4005 a table look-up is performed using the value of TW. This look-up is conducted using data which has been recorded in a manner to define a two dimensional table and wherein a value KFP is recorded in terms of TW.

At step 4006 the instant value of KF resident in memory is updated to the value of KPF obtained in step 4005. Following this flag FLAGK is incrementally increased by one (step 4007) and the new value of KF set in RAM.

With this arrangement each time a backfire occurs the flag FLAGK is incremented by 1. Accordingly, at step 4009 it is determined if the number of backfires has exceeded a predetermined number which in this case is set at 5. In the case the number of backfires is 5 or less the program flows to step 4008. However, if the number has exceeded 5 then the program resets flags FLAGOK, FLAGC and FLAGK in the manner shown in step 4010. With the flags set in this manner on the next run of the program the run will end upon entering step 4001.

It will be noted that although the step of memorizing the value of KF is shown just prior the end of the routine and in a position which will ensure the most rapid adjustment of the correction factor KF being used in the fuel injection calculation; it is alternatively possible to move this step to immediately follow the flag setting step 4010. In this location it would be assured that the correction factor KF with which the actual injection control is being modified would not be changed until more than 5 backfires had occured. As will be appreciated until step 4010 is executed the program will flow through at least steps 4001–4003, 4009 and 4008. However, after the flag setting in step 4010 the program will very quickly end following step 4001.

As the pressure change which accompanies a backfire can vary due to the location and opening degree of the engine throttle valve, a swirl control vane (if provided) and other apparatus in the induction system, it is within the scope of the intant embodiment to use a light sensor or another form of electronic detection arangement which enables the combustion which characterizes a backfire, to be detected, in lieu of the pressure sensor.

As will be obvious, it is possible if so desired, to combine the first and second embodiments by providing the engine system with both an exhaust gas air-fuel ratio sensor and a induction pressure sensor and to modify the program involved with analysing the input in a manner to permit one to varify the other.

THIRD EMBODIMENT

Figure 10:
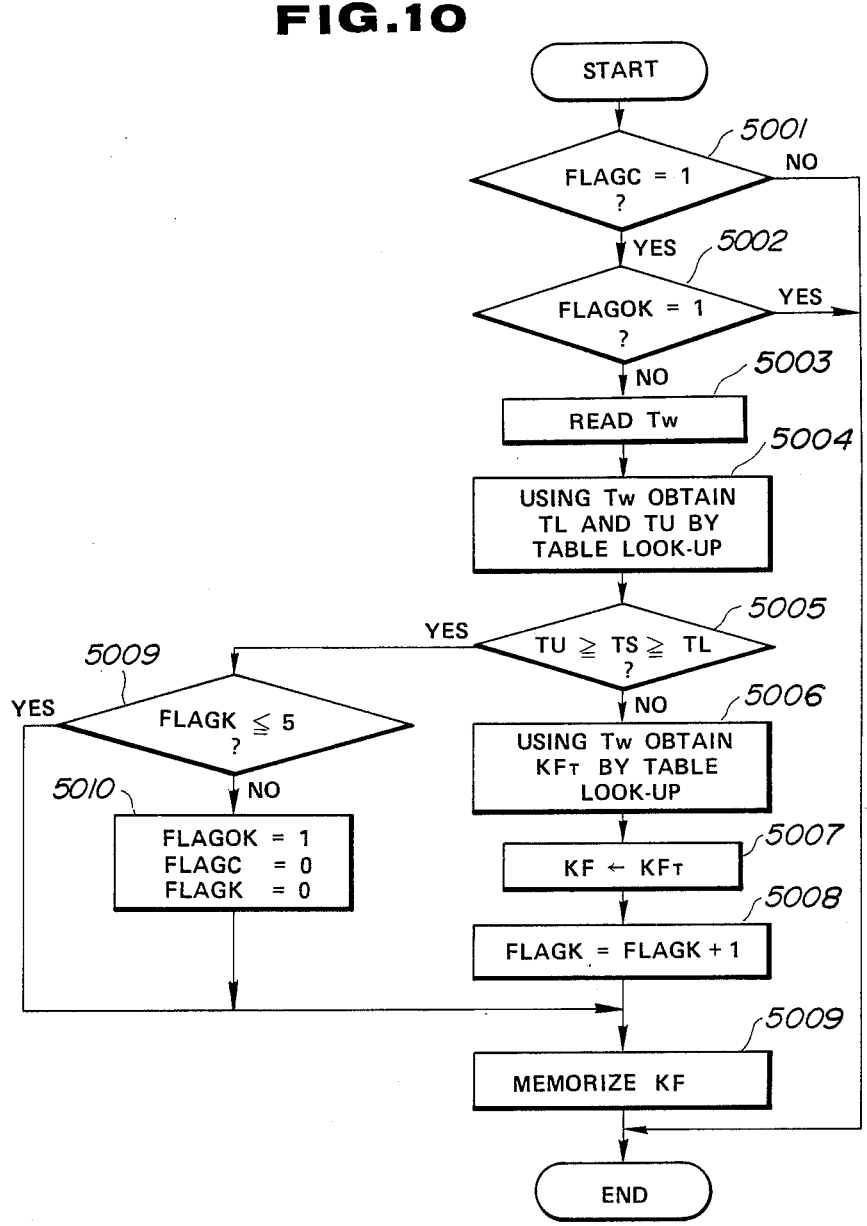
FIG. 10 is a flow chart showing the operations which are performed in connection with a third embodiment of the present invention.

FIG. 10 depicts the control provided by a third embodiment of the present invention. In this arrangement the engine coolant temperature is used as a parameter for determining the correction factor to be used in connection with injection control.

When heavy fuel is used, the time required for the engine to warm and reach a given temperature is longer than in the case that regular or standard fuel is combusted. Conversely, when light fuel is used, the given temperature is reached in a shorter period of time. Accordingly, by monitoring the rate at which the temperature is increasing renders it possible to estimate what kind of the fuel is currently being supplied to the engine.

The first two steps of this program are the same as the corresponding steps in the previous program.

At step 5003 the output of the coolant temperature sensor 11 is read and the instant TW value recorded in RAM. At step 5004 a table-look up is performed using TW and two-dimensional tables. Viz., a TU table and a TL table. These tables respectively indicate the upper and lower time limits TU and TL which define a time period within which the engine should reach a predetermined temperature.

In the event that the time TS which has elapsed since the engine was started is greater than TU (TS>TU) it can be assumed that heavy fuel is being combusted while in the event that TS<Tl it can be assumed that light fuel is being supplied to the engine. It will be noted that as the table look-up of TU and TL is conducted with respect to the coolant temperature TW, in the event that the engine has just been re-started and is relatively hot, the lenght of TU and TL will of course be much shorter than in the case of a completely cold start.

At step 5005 the time TS which has elapsed since the engine was started and for which the engine has been warming-up, is ranged against TU and TL in the manner illustrated. While TS has not yet reached TL and is outside the range the program flows to step 5006 wherein a table look-up is carried out in a manner which enables the appropriate value of KFT (correction factor for heavy fuel) to be obtained. This table is essentially the same as that shown in FIG. 6 and those which have been used in steps 3007, 3009 and 4005.

It should be noted with this and the other embodiments of the invention disclosed up to this point that they can be applied with equal effect to multiple point and single point injection type fuel supply arrangements.

It also should be noted that as a variant of the above program it is possible to separately compare the time TS with the limits TU and TL in a manner which enables heavy, light and regular type fuels to be distinguished as will be obvious from the above discussion and is not limited to the illustrated arrangement wherein only a heavy fuel correction factor is obtained by table look-up.

FOURTH EMBODIMENT

A fourth embodiment of the present invention features the replacement of the KF correction factor with an ignition timing parameter. The reason for this is that, when the fuel supplied to the engine changes from regular to either heavy or light, it is also necessary to change the ignition timing during transitional modes of operation. Accordingly, in accordance with the fourth embodiment, a ignition timing correction factor ADV can used in essentially the same manner as the fuel correction factor. However, as will be appreciated the equation in which the ADV factor is used will be different from the one used for injection control.

It is also within the scope of the present invention to combine the ignition and injection controls in a manner which enables a further improvement in combustion control.

It is advantageous at this point to note that the routines used in connection with the control which characterizes the instant invention need not be run on a cycle by cycle basis and can be run with relatively long intervals therebetween. This feature will become more clearly appreciated as a discussion of subsequent embodiments is made in connection with FIGS., 11 to 25.

FIFTH EMBODIMENT

Figure 11:
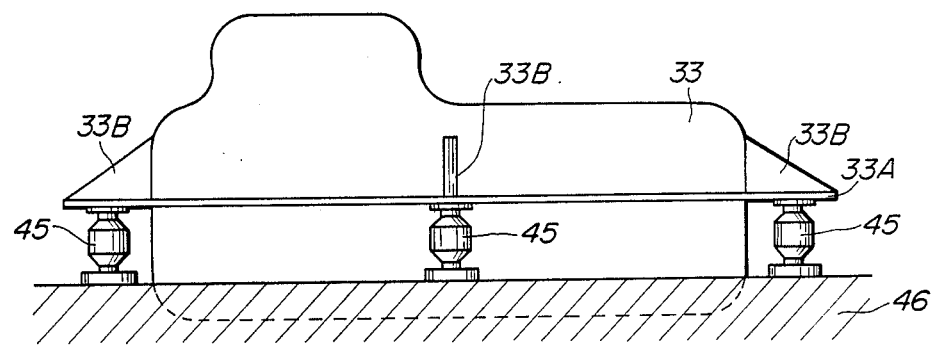
FIGS. 11 and 12 are respectively plan and elevation view of a fuel tank which is supported on load cells in a manner which permits the weight of the fuel remaining in the tank to be determined.
Figure 12:
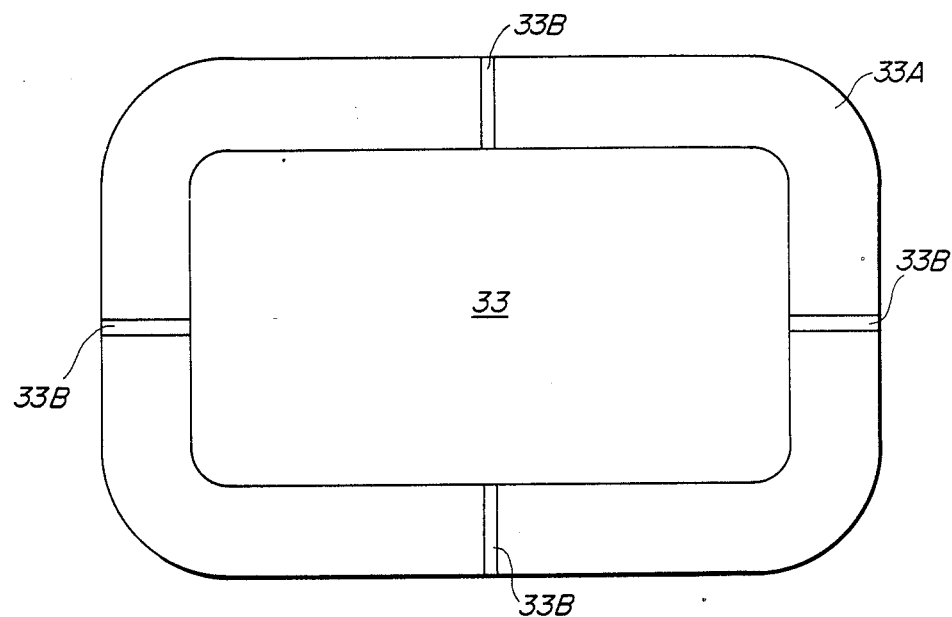

FIGS. 11 and 12 show as arrangement which is used in connection with a fifth embodiment of the present invention. In this arrangement the fuel tank 33 is provided with a horizontally extending flange 33A which is re-enforced with webs 33B. A plurality of load cells 45 are interposed between the flange 33A and the chassis. The load cells 45 are arranged to produce electrical signal which vary with the strain induced therein and thereto and therefore indicate the weight of the tank. In this embodiment the weight indicating signal will be denoted by FJ.

Figure 13:
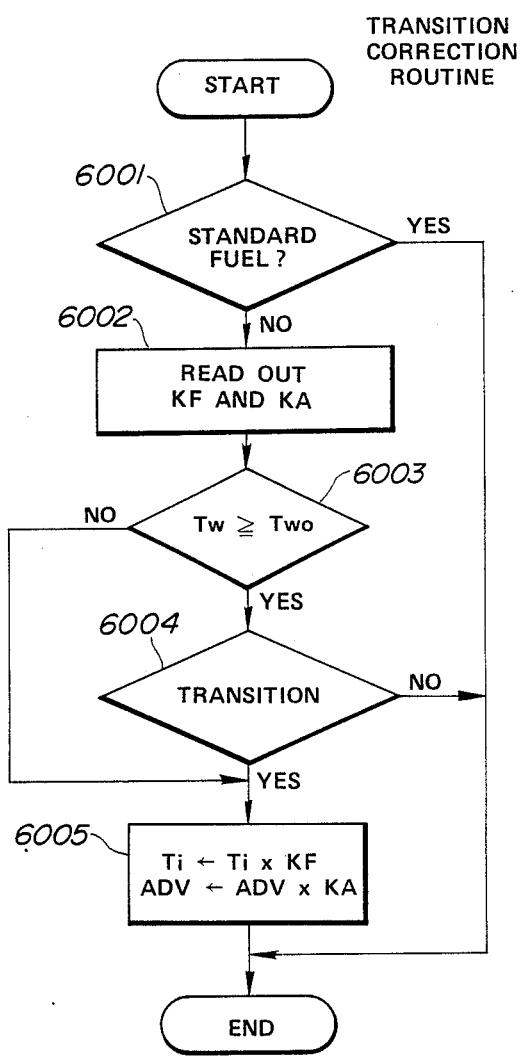
FIG. 13 is a flow chart of a routine which is basically similar to that shown in FIG. 4 but which features the inclusion of an ignition timing correction factor in addition to the fuel type correction one.

FIG. 13 shows a flow chart depicting the operations which are carried out in the fifth embodiment. It will be noted that in this instance that correction factors for both of the fuel and ignition timing are produced by the same program and subsequently memorized for used in connection with the respective calculations.

The program which is depicted in FIG. 13 is in fact essentially the same as that shown in 4 and differs in that two correction factors are determined by table-look up.

It will be appreciated that this embodiment also permits the reduction in system cost as the tables which are used are two-dimensional types and therefore do not consume much memory space. As the programs are relatively short and/or are shortenable (see the routines shown in FIGS., 7 and 9 by way of example), the amount of CPU time required is relatively small thus freeing the device for other calculations and operations.

Figure 14:
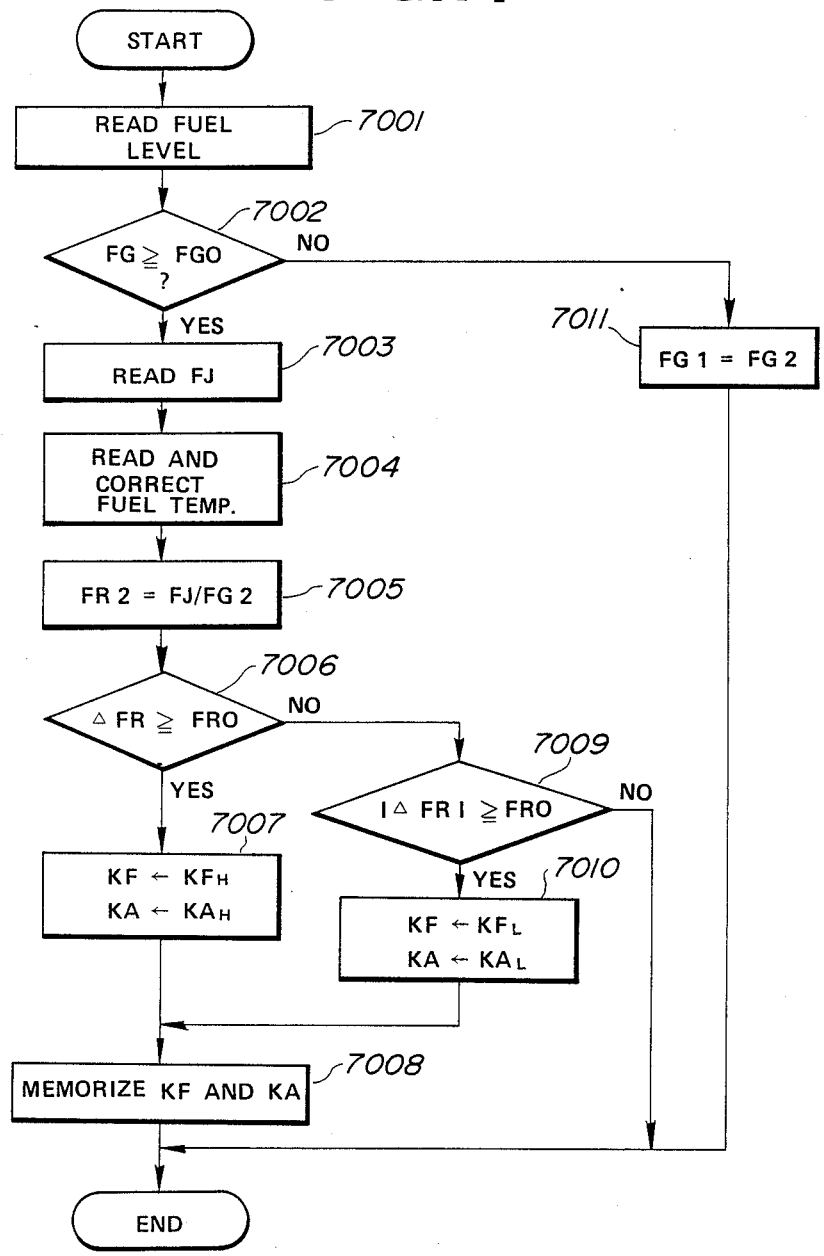
FIG. 14 shows the steps which are carried in connection with a fifth embodiment of the present invention.

FIG. 14 shows a fuel type discrimination routine which is run in accordance with the fifth embodiment.

In this routine the first step 7001 is such as to read the output of the fuel gauge or level sensor 39 (FG2) and to determine a value Delta FG (FG2−FG1 wherein FG1 is the value memorized on the previous run). At step 7002 it is determined if Delta FG is equal to or greater than a predetermined value FG0 or not.

In the event of a negative outcome it is assumed that as very little change has occured in the fuel level in the tank, data derived on previous runs will still hold true for the instant set of circumstances and that there is no need to redundantly repeat the execution of the fuel discrimation steps. Accordingly, the program flows directly to step 7011 wherein the instant value of FG1 is updated to assume the value of the instant FG2 reading. This of course forshortens the run and thus reduces the load on the microprocessor CPU.

At step 7003 the output of the load cell arrangement which supports the fuel tank 33 is read and the instant value of FJ set in RAM.

At step 7004 the temperature of the fuel in the fuel tank 33 is determined by reading the output of a temperature sensor or like arrangement (not shown) disposed in the fuel tank or associated with some other section of the fuel supply system, value of FG2 is suitably corrected for use in calculations.

As step 7005 the instant RD (relative density) of the fuel FR2 being supplied to the engine is derived (FR2=FJ/FG2). The difference between this value and that of regular or standard fuel (Delta FR) is determined. In step 7006 Delta FR is compared with a predetermined value FRO.

In the event that difference in RD (Delta FR) of the fuel is determined to be equal to or greater than the value FR0, it is assumed that the fuel is of the heavy type and the routine flows to step 7007 wherein table look-ups to determine the most appropriate values of KFH (fuel type) and KAH (ignition timing) correction factors for heavy fuel are executed and subsequently used to update the instant values currently resident in memory.

In step 7008 these value are set in non-volatile memory sections used by the routine shown in FIG. 13 and which utilizes this value for calculating the injection control pulse width and ignition timings.

On the other hand, if the outcome of the comparison performed in step 7006 indicates that the change in fuel RD is less than FR0, it is assumed that the fuel being supplied is of the so called light type. Accordingly, the program flows to step 7009 wherein the absolute value of the change is compared with the same standard FRO. In the event that the value is found to be greater than FR0 then at step 7010 table look-ups and updating of the fuel type and ignition timing for light fuel are conducted. In the event that the outcome of the comparison at step 7009 is negative indicating that the absolute change in fuel relative density is less than FP0 then it is assumed that no change in correction factors is warrented and the program ends.

SIXTH EMBODIMENT

Figure 15:
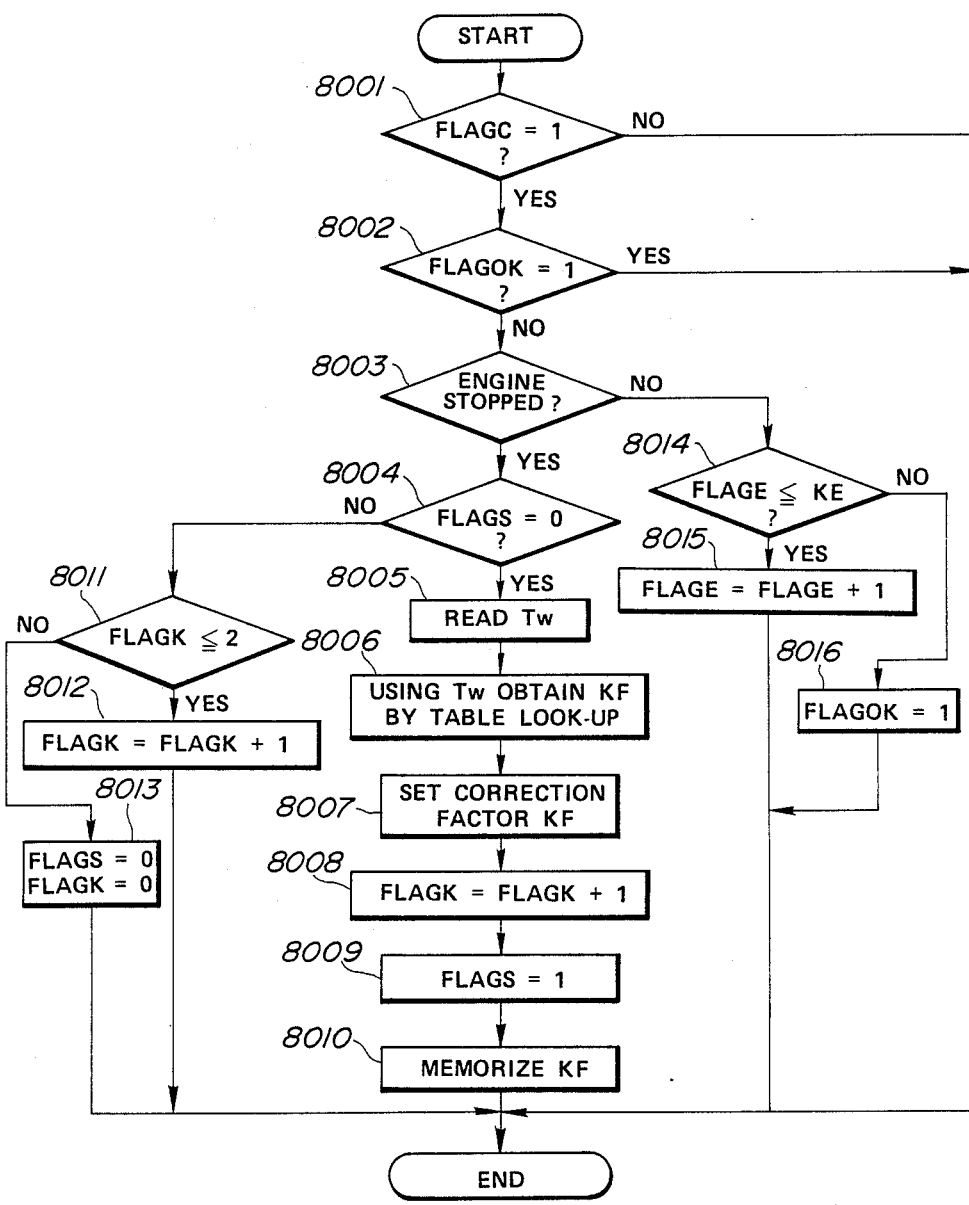
FIG. 15 depicts the operation and control which characterizes a sixth embodiment of the present invention.

FIG. 15 shows a routine which characterizes a sixth embodiment of the present invention. This embodiment features the detection of engine stoppage (stalling) of the nature which indicates that the heavy fuel is causing temporary lean air-fuel mixtures when the engine operation enters a transient mode.

As will be noted, step 8003 is such as to determine if the engine has stopped or not. This can be determined by sampling the output of the rotational angle sensor 6 and determining if the engine speed is below a predetermined level or not. For example if the engine rotational speed is determined to be below 200 RPM (merely by way of example) it can be assumed that the engine is not running under its own power.

Alternatively, it is possible to detect engine stoppage of the nature caused by excessibly leand mixtures if the output of the exhaust gas air-fuel ratio sensor 31 indicates a mixture which is abnormally lean and which remains leaner than a predetermined value for more than one second (for example).

However, as it is possible that improper driving of the vehicle rather than overlean mixtures being induced by the supply of heavy fuel, the routine shown in FIG. 15 includes various flag setting operations which are designed to distinguish between the two different phenomenon. For example, in this routine flag FLAGK is included and arranged to act as counter which counts the number of engine stoppages.

In more detail, following the detection of an engine stoppage in step 8003 the program goes to step 8004 and determines if FLAGS is zero nor not. In the event that the outcome of this enquiry is positive then the program flows to step 8005 to 8010 wherein the coolant temperature TW is read; the correction factor KF for heavy fuel is looked up using TW; the value of KF is set in memory; the count of flag FLAGK in incremeneps 8005 to 8010 will only be conducted once and the program will be redirected to step 8011 on the next run in the case that the engine is detected as having stopped (step 8003).

It the outcome of the enquiry conducted at step 8003 indicates that the engine has not stopped then the program flows to step 8014 wherein the instant value of a FLAGE is compared with a predetermined number of engine revolutions KE (in this instance 5 merely by way of example). While the count of FLAGE is less than KE the program incrementally increases the count by one on each run.

In the event that the engine operates smoothly and without stoppage for a given short period and FLAGE=KE, flag FLAGOK is set to one in step 8016 and thus provides that the program will end upon entering step 8002 on the next run. This means that the program will be run only a limited number of times before induced to terminate almost after beginning and accordingly reduce the amount of CPU time consumed to close to the minimum.

However, in the event that engine is detected as having stopped in step 8003 and flag FLAGS =1 (due to a previous run through steps 8005–8010 for example) then at step 8011 the instant count of FLAGK is checked.

While the count of this flag is less than or equal to 2 the routine will induced to pass through set and incrementally increase the count by 1. Upon the count being exceeded flags FLAGS and FLAGK are both set to zero. This establishes the possibility that the engine stoppage is still occuring due to an incorrectly determined correction factor KF and re-opens the door to steps 8005 to 8010 to permit the correction factor to be reset if necessary.

SEVENTH EMBODIMENT

FIGS. 16 and 17 show the steps which characterize a seventh embodiment of the present invention.

This embodiment is based on the observations performed by the exhaust gas air-fuel ratio sensor 31.

In this embodiment the flag setting routine depicted in FIG. 17 is run once following the intialization of the system. This routine is basically similar to that shown in FIG. 5 and differs basically in that the number of flags set are reduced.

As will be noted the first two steps are essentially the same as the corresponding ones of the flow chart shown in FIG. 15. The third step 9003 is such as to selectively sample in the inputs of the various sensors and determine if the engine is operating in a treatment mode or not.

In the event that the program flows to step 9004 the instant TW value is determined and in step 9005 this value is used to look-up values for AFL and AFR are determined by table look-up and set in RAM for further processing. In this instance the value AFL denotes the permissible deviation of the air-fuel ratio from the target value toward the lead side while the value AFR denotes the permissible deviation from the target value toward the rich side.

At step 9006 the output of the exhaust gas air-fuel ratio sensor 31 is read and the instant difference between the target air-fuel ratio and the instant one (Delta A/F) is determined. At step 9007 the instant Delta A/F value is compared with the AFL value obtained in step 9005. In the event that the instant A/F value is leaner than the permissible limit AFL, a counter TL is set to count up the number of cycles for which the excessively lean mixture persists (see steps 9007, 9008). On the other hand, if the program flows to step 9009 as a result of Delta A/F being found to be less than AFL then the absolute value of Delta A/F is compared with AFR. In the event that the mixture is deemed to be richer than the maximum permissible limit AFR then a counter TR is arranged to count up and record the period for the rich mixture persists.

Figure 18:
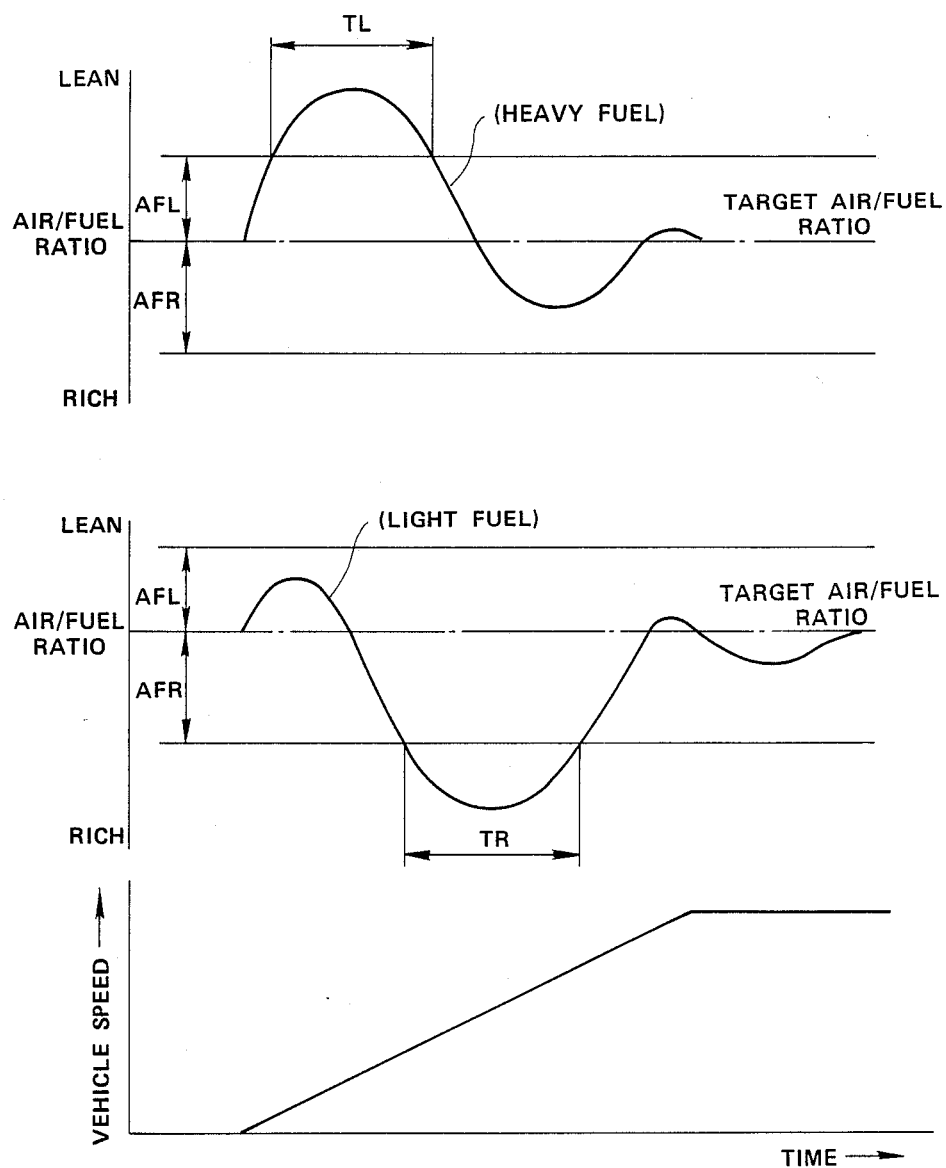

As will be appreciated from FIG. 18 when heavy fuel is used the air-fuel ratio will tend to become lean following the initiation of a transient mode of operation, for reason set forth hereinbefore. On the other hand, when light fuel is used the mixture tends to become rich as shown.

In order to determine if the air-fuel mixture has remained excessively rich or lean for a period sufficiently long as to confirm the type of fuel being used, the routine shown in FIG. 16 is arranged to include steps 9011 and 9013. In these steps the TL and Tr counts are compared with predetermined values LL and RR. In the event that TL is equal to or greater than LL it is assumed that the fuel is of the heavy type and in step 9012 the appropriate KF value for heavy fuel (viz., KFH) is derived by table look-up and placed in memory ready for transfer to the non-volatile memory section from which the routine shown in FIG. 13 (for example) reads data ready for the injection and or ignition timing calculations.

Simlar operations for light fuel are performed in steps 9013 and 9014.

However, in the event that neither LL or RR are exceeded the program flows to step 9016 wherein flags FLAOK is set to 1, FLAGC is set to zero and TL and TR are reset to zero.

As will be appreciated once step 9016 has been executed the program will be induced to end almost as soon as it has begun. This of course reduces the amount of CPU time required.

EIGHTH EMBODIMENT

An eighth embodiment of the present invention is based on the concept that even though fuel can be injected from a location very close the combustion chamber, some of the fuel inevitably wets the walls of the induction port. Depending on the nature of the fuel the amount of fuel which is actually inducted into the cylinder varies. Thus, if the amount of fuel supplied is denoted by FC and the amount of fuel actually inducted into the cylinder indicated by FIN then it can be shown that the difference Delta F=FC−FIN. Viz., Delta F represents the amount of fuel that does not get inducted during the instant induction phase. With heavy fuel Delta F is relatively large while with light fuel Delta F is relatively small.

Accordingly, by comparing Delta F with predetermined DFL and DFU values it can be assumed that when Delta F<DLF light fuel is being injected, while in the event that Delta F>DFU heavy fuel is being used.

However, in order to perform this comparison it is necessary to be able to determine FIN. While it is basically impossible to directly sense this value, it is possible to sense the air-fuel ratio AF of the exhaust gases. Accordingly, if AIN is used to denote the amount of air which is inducted into the cylinder it can be shown that FIN=AIN/AF. In this instance however, it should be noted that AIN is represented by the boost pressure.

In accordance with the above steps 11004–11008 and 11011 and 11015 are provided. Viz., at step 110004 the value of FC (the amount of fuel injected) is derived by accessing the result of the injection volume control program. In step 11005 AIN is obtained by reading the output of the induction pressure sensor 81 and in step 11006 AF is determined by reading the output of the exhaust gas air-fuel sensor 31 is read and recorded. At step 11007 FIN is calculated and subsequently used in step 11008 to derive the instant value of Delta F.

However, with the instant embodiment it is deemed necessary in the interest of an accurate analysis of the fuel type, to repeat the above readings and calculation a predetermined number of times before accepting the data. Accordingly a counter CNTS is included in the program and the program is arranged not to flow to step 11010 until such time as the requesite number of cycles is completed. At step 11010 the average DF of the ten Delta F readings is derived and compared with the previously mentioned predetermined values DFL and DFU in steps 11011 and 11015.

The remaining steps of this routine are deemed obvious in light of the disclosure of previous embodiments and will be omitted for brevity.

Figure 21:
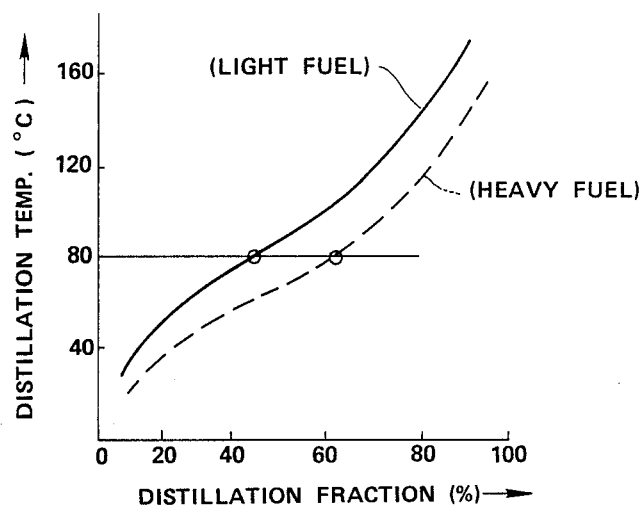
Figure 22:
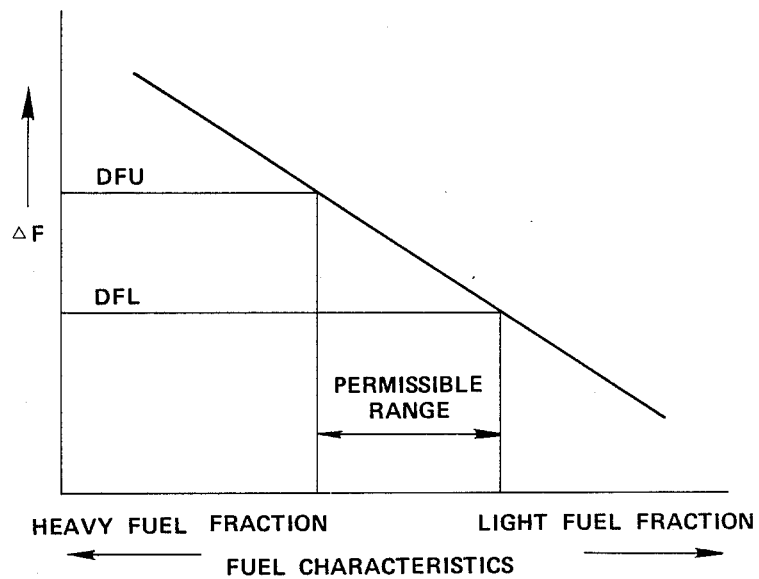

FIGS. 21 and 22 show in graphical form details pertinent to the operation of the instant embodiment.

NINTH EMBODIMENT

Figure 23:
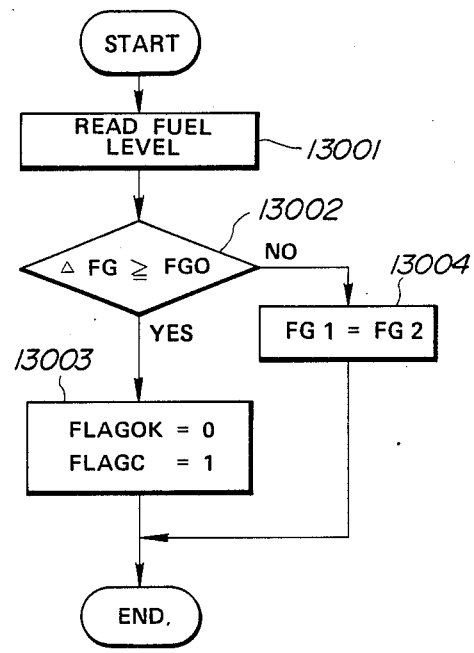
FIGS. 23 to 25 are flow charts which depict the operations and arrangement which characterizes a ninth embodiment of the present invention.
Figure 24:
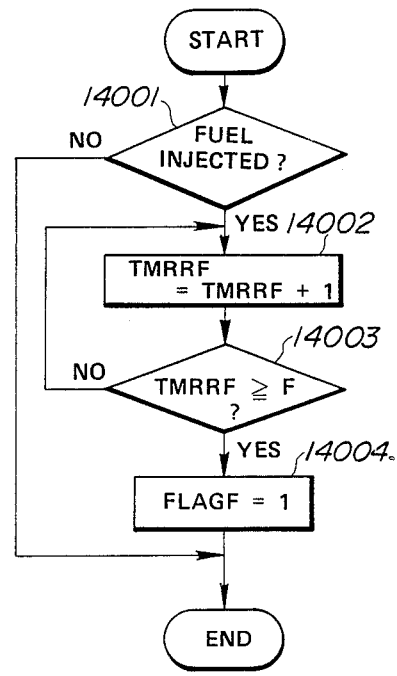
Figure 25:
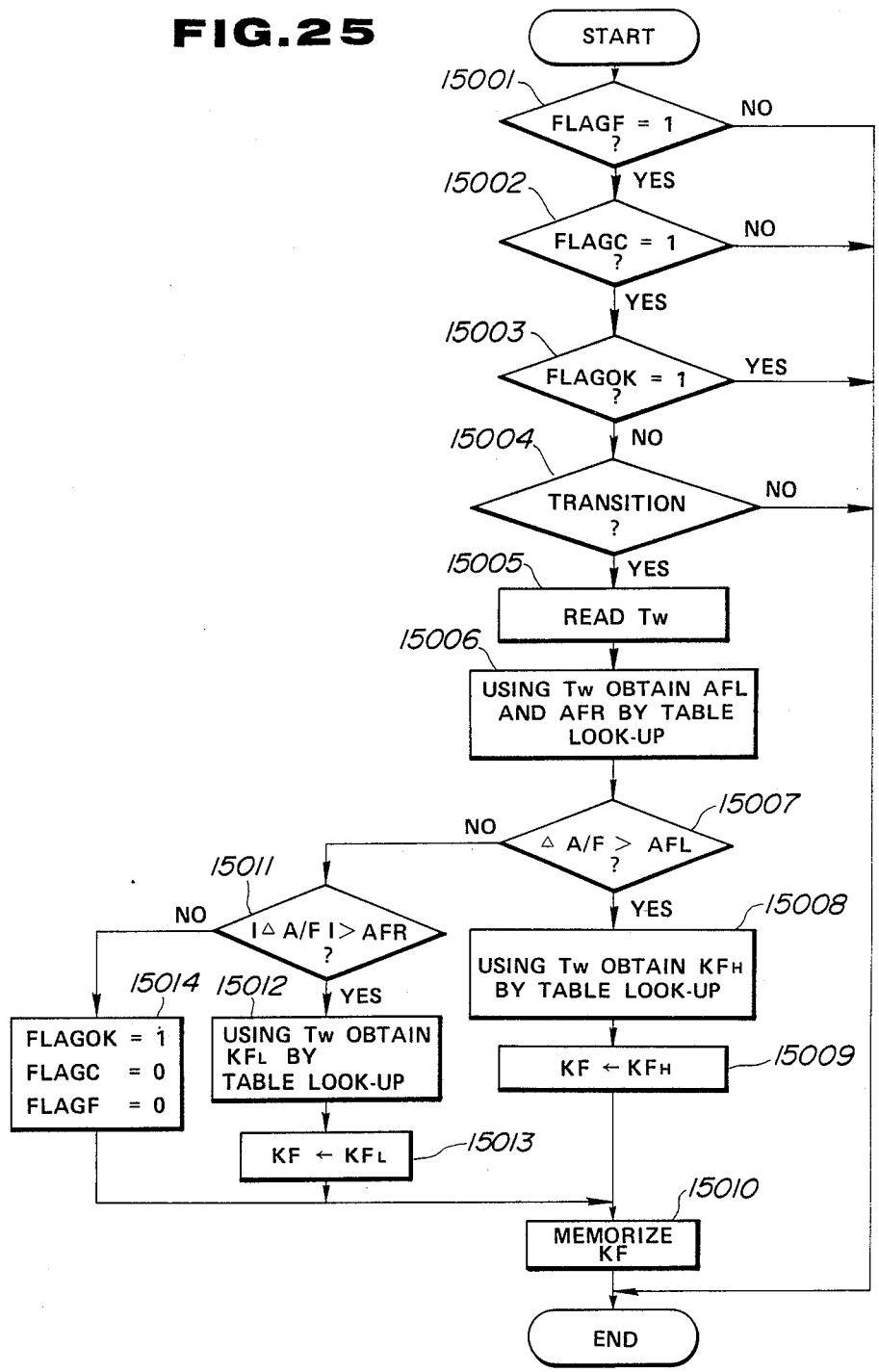

FIGS. 23 to 25 show a ninth embodiment of the present invention. In this arrangement the routine depicted in FIG. 23 is for all intensive purposes the same as those shown in FIGS. 5 and 17 for example. The routine shown in FIG. 24 however is such as to feature the provision of a counter TMRRF which is such as count the number of fuel injections performed from the point in time the transient mode was induced and set a flag FLAGF to 1 (step 14004) when a predetermined number F injections have occurred. This of course tends to limit the number of times the the program can run deeply into the routine shown in FIG. 25 and thus limit the maximum load which can be placed on the CPU.

It will be noted that the routine shown in FIG. 24 can be applied with effect to other embodiments of the invention is so desired.

ALTERNATIVE ARRANGEMENTS

It will be noted that it is possible to replace the fuel type correction factor with an ignition timing one and-/or utilize the two in combination in the embodiments of the present invention wherein such a combination and/or replacement has not been specifically disclosed.

For further disclosure relating to the a system designed to analyse the type of fuel being combusted in the cylinder or cylinders of an internal combustion engine, reference can be had to copending U.S. Pat. application Ser. No. 094,979 filed on Sept. 9, 1987 in the name of Abo et al.

This application relates to an arrangement wherein a strain guage type combustion chamber pressure sensor is used to monitior the pressure development on a cycle by cycle basis and to determine the nature of the fuel by noting the rate which the combustion pressure changes over a ten cycle period following the entry into a transitional mode of engine operation.

What is claimed is:

1. A method, comprising:
sensing the magnitude of a first parameter, said first parameter having a predetermined relationship with the nature of the fuel supplied to a cylinder of an internal combustion engine;
comparing the magnitude of said first parameter with a first predetermined value;
sensing a temperature which varies with the temperature of the engine in the event that the magnitude of said first parameter exceeds said predetermined value;
determining a correction factor using said temperature; and
using the correction factor in an engine control.

2. A method as claimed in claim 1 further comprising the steps of:
repeating the steps of sensing the first magnitude, comparing, sensing the temperature, determining the correction factor, and using the correction factor in an engine control; and
setting a flag in the event that said first parameter is determined to be less than said first predetermined value;
by-passing any subsequent steps of sensing the first magnitude, comparing, sensing the temperature and determining the correction factor, following the flag setting operation.

3. A method as claimed in claim 1, further comprising the steps of:
sensing the presence of the transitional engine operation;
by-passing said steps to of sensing the magnitude of said first parameter, comparing, sensing the magnitude of said second parameter, and determining said correction factor in the event that transitional operation is sensed as being absent.

4. A method as claimed in claim 2 further comprising the step of preventing said flag from being set until said step of comparing has been executed a predetermined number of times.

5. A method as claimed in claim 2 wherein said flag setting operation is induced after said step of comparing has been executed a predetermined number of times irrespective of the outcome of said comparison.

6. A method as claimed in claim 1 further comprising the steps of:
sensing a third parameter, said third parameter varying with the amount of fuel contained in a fuel tank associated with said engine;
determining the difference between the instant magnitude of said third parameter and a previously recorded value;
setting a flag in the event that the difference between the two values is less than a predetermined amount.

7. A method, comprising:
sensing the presence of transitional operation of an internal combustion engine;
sensing the temperature of the engine;
selecting first and second air-fuel ratio limits from first and second schedules using the sensed temperature, said first schedule being adapted for a first type of fuel and said second schedule being adapted for a second type of fuel;
sensing the air-fuel ratio of the exhaust gases of said engine;
determining the difference between the instant air-fuel ratio and a predetermined air-fuel ratio;
comparing the difference between the two air-fuel ratios with said first air-fuel ratio limit;
using the engine temperature to obtain a first correction factor from a third schedule in the event that said difference is greater than said first air-fuel ratio limit;
comparing the absolute difference between the two air-fuel ratios with the second air-fuel ratio limit in the event that said difference is less than said first air-fuel ratio limit;
using the engine temperature to obtain a second correction factor from a fourth schedule in the event that said difference is greater than the second air-fuel ratio limit;
establishing a condition wherein the steps of sensing transitional engine operation to using the engine temperature are by-passed in the event that the absolute temperature difference comparing step indicates that the absolute difference is less than the second air-fuel limit;
using said first correction factor for engine control in the event that said difference is greater than said first air-fuel ratio limit; and
using said second correction factor for engine control in the event that said difference is greater than said second air-fuel ratio limit.

8. A method as claimed in claim 7 further comprising the steps of:
sensing the amount of fuel in a fuel tank associated with said engine;
recording the amount of fuel;
comparing the amount of fuel with a previously recorded amount;
determining the difference between the instantly recorded amount and the previously recorded amount;
setting a flag which induces said bypassing of the steps of sensing transient engine operation to using the engine temperature in the event that difference between the instantly recorded amount and the previously recorded amount is less than a predetermined volume change.

9. A method as claimed in 7 further comprising the steps of:
controlling the engine in accordance with the selected one of said first and second correction factors in the absence of transitory engine operation in the event that the temperature of the engine is sensed as being less than a predetermined temperature.

10. A method as claimed in 9 further comprising the steps of:

by-passing the use of the selected one of said first and second correction factors in the event that the engine temperature is sensed as being equal to or greater than said predetermined temperature and said engine is not undergoing transitional operation.

11. A method, comprising:

sensing the presence of transitional operation of an internal combustion engine;

sensing the magnitude of a first parameter, said first parameter having a predetermined relationship with the nature of the fuel supplied to a cylinder of said internal combustion engine;

comparing the magnitude of said first parameter with a first predetermined value;

sensing a temperature which varies with the temperature of the engine in the event that the magnitude of said first parameter exceeds said predetermined value;

determining a correction factor using said temperature;

using the correction factor in an engine control; and by-passing said steps of sensing the magnitude of said first parameter, comparing, sensing the magnitude of said second parameter, and determining said correction factor in the event that transitional operation is sensed as being absent.

* * * * *